United States Patent [19]

Melrose et al.

[11] Patent Number: 4,577,661
[45] Date of Patent: Mar. 25, 1986

[54] HIGH SPEED-HIGH FLOW SPOOL VALVE

[75] Inventors: David R. Melrose, Ringoes; Mario A. Russo, Edison, both of N.J.

[73] Assignee: Ingersoll-Rand Company, Woodcliff Lake, N.J.

[21] Appl. No.: 715,766

[22] Filed: Mar. 25, 1985

Related U.S. Application Data

[63] Continuation of Ser. No. 624,790, Jun. 25, 1984, abandoned, which is a continuation of Ser. No. 330,226, Dec. 14, 1981, abandoned.

[51] Int. Cl.$^4$ .......................... F16K 3/26; F16K 31/06
[52] U.S. Cl. ...................... 137/625.33; 251/129.15; 251/129.11; 137/625.32
[58] Field of Search .............. 137/625.33, 625.28, 137/625.3, 625.38, 625.31; 251/129

[56] References Cited

U.S. PATENT DOCUMENTS

| 1,654,642 | 1/1928 | Geissinger | 251/129 X |
| 1,938,943 | 12/1933 | Terry | 137/625.38 |
| 2,288,607 | 7/1942 | Chandler | 251/129 X |
| 2,380,631 | 7/1945 | Cones | 137/625.3 |
| 2,601,231 | 6/1952 | Smith et al. | 137/625.33 |
| 3,127,909 | 4/1964 | Alamprese | 137/625.31 |
| 3,368,791 | 2/1968 | Wells | 251/129 |
| 3,469,818 | 9/1969 | Cowan | 251/129 |
| 4,375,821 | 3/1983 | Nanao | 137/625.38 |

Primary Examiner—Arnold Rosenthal
Attorney, Agent, or Firm—Arthur N. Trausch, III

[57] ABSTRACT

An ultra fast-acting shut-off valve utilizing a slotted spool in registry with a slotted sleeve which provides full opening with an extremely short valve throw. The valve may be operated by any suitable actuator. An electric solenoid is provided in the preferred embodiment described, making it compatible with electronic micro-processor control systems.

3 Claims, 4 Drawing Figures

HIGH SPEED-HIGH FLOW SPOOL VALVE

This is a continuation of Ser. No. 624,790, filed June 25, 1984, abandoned, which was a continuation of Ser. No. 330,226, filed Dec. 14, 1981, abandoned.

BACKGROUND OF THE INVENTION

For many control applications, a high speed-high flow valve is essential. Several attempts have been made to increase valve response time by utilizing smaller and lighter valve actuators. The majority of these attempts have resulted in restricted flow in the full open position and erratic and unreliable valve operation in other instances. It is desirable to have a valve with as fast a response time as possible for commercial applications such as fastener torque or tension control. It is also desirable to have a valve which, in addition to having fast response time, has high flow capabilities in its open position and a short throw to a closed position.

SUMMARY OF THE INVENTION

The object of this invention is to provide a fast-acting, high flow valve having extremely fast response time. Another object of the invention is to provide a valve with high flow capabilities and an extremely short throw from its open to closed position. The valve of this invention is suitable for use as a torque control device or similar services requiring a rapid response. The principal features of the invention include minimum internal components which are easily and economically manufactured and which are readily replaced.

The object of the invention is to provide a fast-acting, high flow valve having a slotted spool member in registry with a slotted sleeve member wherein control is effected by registry of the slots in the spool and sleeve members. It is a further object of the invention to provide slots in both the spool and sleeve members which have a substantial length to width ratio wherein a small amount of movement is required to effect full registry and full interference of the slots. It is a further object of this invention to effect registry by linear axial displacement of the spool in one embodiment and by rotary displacement of the spool in a second embodiment.

It is yet a further object of the invention to provide a construction alternative which readily changes the valve from a normally open to a normally closed configuration. It is yet a further object to provide a fast-acting, high flow valve which is operated by a linear or rotary actuator such as an electric solenoid.

These and other objects are obtained in a valve which interrupts the flow of pressure fluid comprising: a valve body having a central bore, a pressure fluid inlet entering the bore, a pressure fluid outlet from the bore, a first valve means having multiple slots disposed between the pressure fluid inlet and the pressure fluid outlet, a second valve means having similarly oriented multiple slots disposed intermediate to the pressure fluid inlet and the pressure fluid outlet, the second valve means being in sliding contact with, and movable relative to, the first valve means to effect alternately registry and interference of the similarly oriented slots in each of the means to effect opening and closing of the valve.

DESCRIPTION OF THE PREFERRED EMBODIMENT

Figure 1:
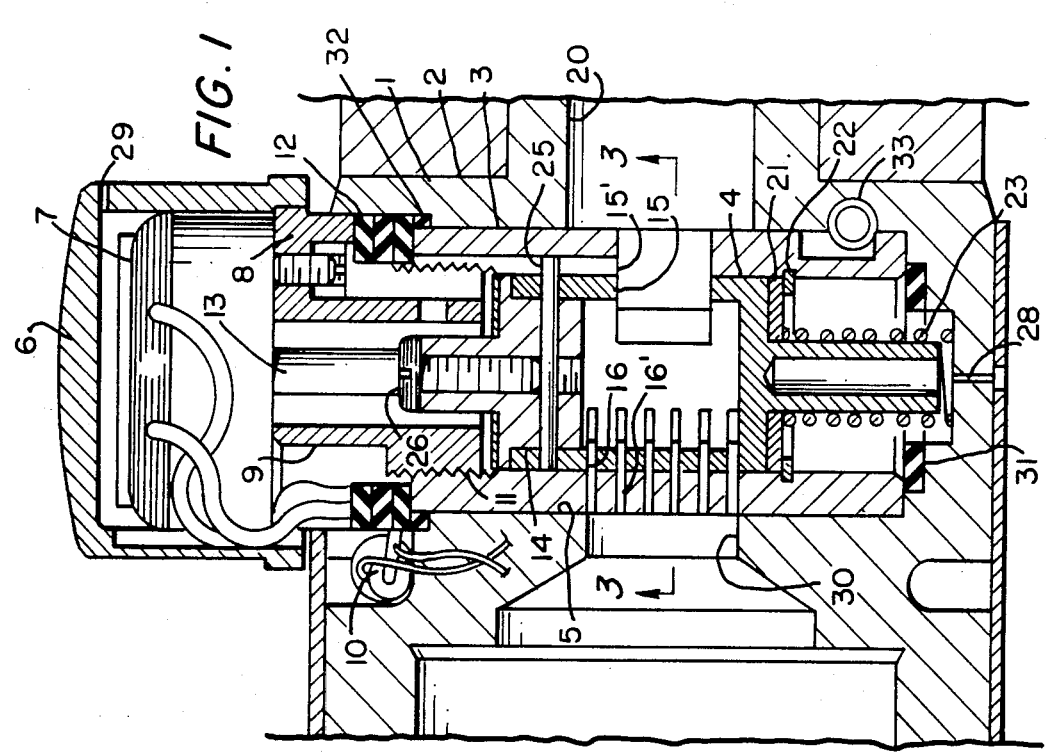
FIG. 1 is a sectioned side elevation view of a valve according to this invention.

The operation description of the invention in the form of the preferred embodiment shown in the drawings may best be understood by referring to FIG. 1 for general assembly and for operation of the related parts.

The valve generally shown by reference numeral 1 in FIG. 1, has a valve body 2 which is provided with a central bore 5 into which is inserted a cylindrical sleeve 3 and which in turn receives a cylindrical valve spool 4 in concentric close-fitting internal registry.

A solenoid operator 7 is connected to the valve body 2 and sleeve 3 by means of a threaded concentric adaptor 9. The threaded concentric adaptor 9 is attached to the sleeve 3 by means of thread 11 and is centralized in the central bore 5 of the valve body 2 by means of flange 8. Spacing washers 12 control the clearance between the solenoid 7 and the sleeve 3. The operating core 13 of the solenoid 7 pushes against an end plug 14 of the valve spool 4. A return spring 23 pushes against the valve spool 4 in the opposite direction. A guide pin 25 inserted through the valve spool 4 and its end plug 14 retains the end plug 14 in the valve spool 4 and further projects beyond the valve spool 4 into a slot in the sleeve 3 to provide a linear guide for the valve spool 4.

The solenoid 7 is provided with a top protective cap 6 and is operated by the electrical connectors 10 which enter the valve body 2 and pass into its central bore 5 and then to the solenoid 7.

An inlet 20 is provided to the valve body 2. The valve body 2 is also provided with an outlet 30 on the opposite side of the valve body 2. Intermediate to inlet 20 and outlet 30 are the sleeve 3 and the valve spool 4. A large wide slot 15 is provided in the valve spool 4 towards the inlet 20. A corresponding wide slot 15' is provided in the sleeve 3 towards the inlet 20. As can be seen in FIG. 1, this will allow pressure fluid entering the inlet to pass into the center of the valve spool 4. The inlet slot 15 is of such width that the normal throw of the valve will not close the inlet slot.

The valve spool 4 is provided with corresponding multiple horizontal slots 16 on the outlet side of the valve which form a grill-like structure. On the outlet side of the valve, the sleeve 3 is also provided with multiple horizontal slots 16' which form a mating grill-like structure. The slots in both the sleeve 3 and the valve spool 4 are shown in registry for full flow through these slots in the valve open position. As shown in FIG. 1, the solid part of the grid on the sleeve 3 may be slightly wider than the slot portion of the grid on the valve spool 4 to eliminate line-to-line contact of the grid as it is displaced.

It can be appreciated by one skilled in the art that displacement of the valve spool 4 by the width of the horizontal slot 16 in the valve spool 4 in the vertical direction will cause the valve to go from full open to full close. The amount of throw required to operate the valve, therefore, is controlled primarily by the physical limitations of slot width and structural rigidity of the slot. The throw, therefore, can be made very small. It should also be noted that there is substantial flow area in the open position.

In the construction of the valve, numerous construction details are shown such as the bottom vent 28 and top cap vent 29 which are required to dissipate leakage of the valve. Likewise, a face seal 31 and an O-ring seal 32 are provided to minimize bypass leakage from the inlet 20 to the atmosphere. A screw 26 is shown as a means for adjusting tolerance makeup between the valve spool 4 and the solenoid core 13. Other suitable means may be employed to perform this function.

One important feature of the invention is the provision of spacer 21 which, upon removal, converts the valve from a normally open valve when energized to a normally closed valve when energized. This is a useful and simple say of converting the valve to various uses. A split ring 22 is shown as the bottom land for limiting downward travel of the valve spool 4. A retaining pin 33 retains the sleeve 3 in the valve body 2.

Figure 2:
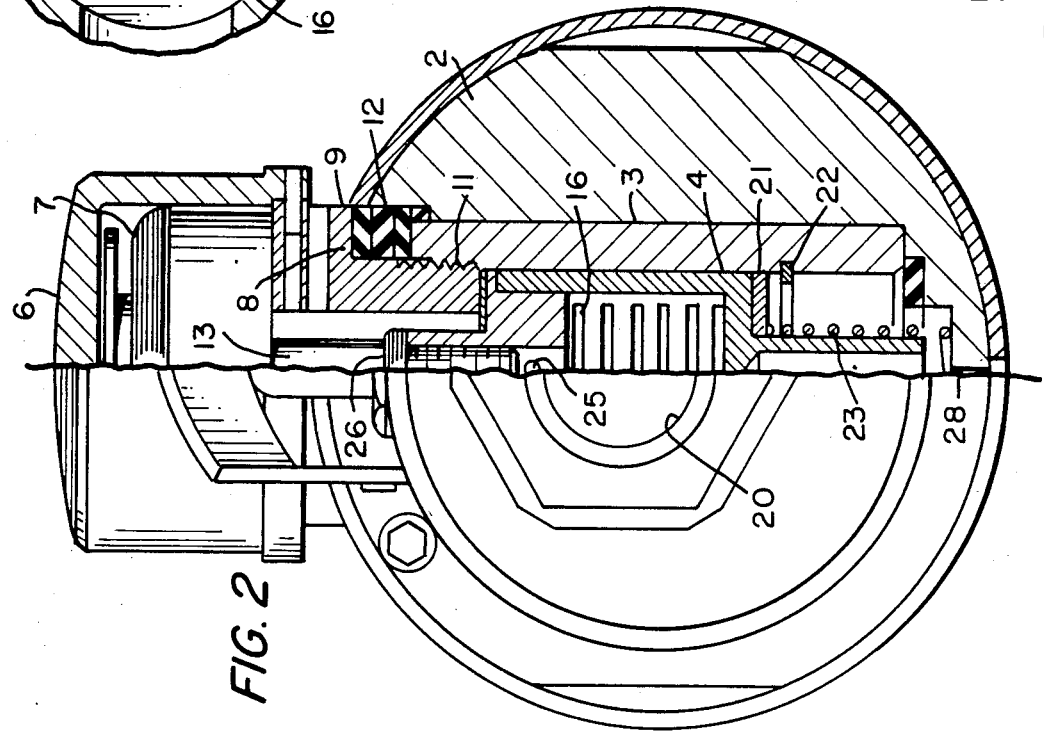
FIG. 2 is a partial section and elevation view of a valve according to this invention.

FIG. 2 shows the placement of the valve spool in the de-energized or closed position of the valve and provides an end view of the valve for further understanding of its construction.

Figure 3:
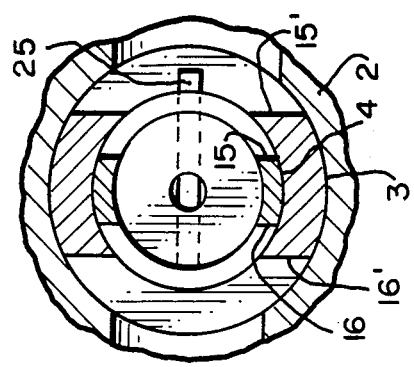
FIG. 3 is a section of the valve taken along line 3—3 of FIG. 1, showing a plan view of the control slots.

FIG. 3 shows the orientation of the valve inlet and outlet in relation to the sleeve and spool slots in a plan view.

Figure 4:
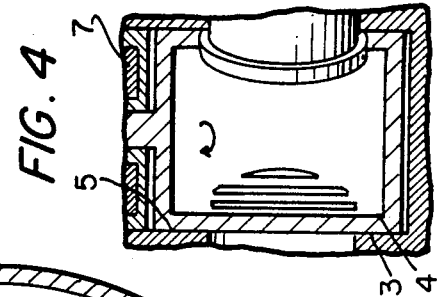
FIG. 4 shows a partial side elevation of an alternative embodiment of the present invention for use with a rotary actuator.

Having described the invention, numerous modifications of the details of construction will occur to one skilled in the art. For example, in FIG. 4 the slot orientation for a rotary actuated version of the valve is indicated. In this case the valve spool would be rotated about its axis by a rotary actuator approximately the width of the slot to effect opening or closing of the valve.

Applicants do not wish to be limited in the scope of the invention except as claimed.

We claim:

1. A valve for interrupting flow of pressurized fluid comprising:
    a cylindrical body having a central cylindrical bore extending along an axis with an inlet opening on one side of the body for receiving pressurized fluid and an outlet opening on an opposing side of the body for discharging pressurized fluid;
    a cylindrical sleeve disposed within said central bore having a sleeve opening adjacent to said inlet opening and having sleeve slots generally perpendicular to said axis across said outlet opening;
    a valve spool disposed within said cylindrical sleeve and movable along said axis within said cylindrical sleeve to a first and second position, said spool having a spool opening having substantially the same cross-sectional area as said sleeve opening and positioned adjacent said sleeve opening and having spool slots generally perpendicular to said axis communicating with said spool opening and positioned adjacent said slots in said sleeve to form a grill-like structure with said slots in said sleeve, said spool slots and sleeve slots having a size selected so that in said one position of said valve spool the slots close the grill-like structure and in said second position of said valve spool said slots open the grill-like structure; and
    a solenoid operator connected to move said valve spool to said first and second position.

2. A valve according to claim 1 wherein said cross-sectional area of the open area of the slots is substantially at least as great as the cross-sectional area of the sleeve opening.

3. A valve according to claim 1 wherein said valve spool has an upper and lower surface and said valve comprises means for venting said upper and lower surfaces to the atmosphere.

* * * * *